US012319343B2

(12) United States Patent
Gordon

(10) Patent No.: US 12,319,343 B2
(45) Date of Patent: Jun. 3, 2025

(54) SUSPENDED REAR-MOUNT DRIVETRAIN ASSEMBLY

(71) Applicant: Robby Gordon, Charlotte, NC (US)

(72) Inventor: Robby Gordon, Charlotte, NC (US)

(*) Notice: Subject to any disclaimer, the term of this patent is extended or adjusted under 35 U.S.C. 154(b) by 408 days.

(21) Appl. No.: 17/735,013

(22) Filed: May 2, 2022

(65) Prior Publication Data
US 2022/0348258 A1 Nov. 3, 2022

Related U.S. Application Data

(60) Provisional application No. 63/183,184, filed on May 3, 2021.

(51) Int. Cl.
B62D 21/11 (2006.01)

(52) U.S. Cl.
CPC ................... B62D 21/11 (2013.01)

(58) Field of Classification Search
CPC ........ B62D 21/11; B62D 21/183; B60K 5/12; B60K 5/1216; B60K 5/00; B60K 5/1208; B60K 2007/0046; B60K 17/00; B60K 2007/0038; B60K 8/00; B60K 5/1283
See application file for complete search history.

(56) References Cited

U.S. PATENT DOCUMENTS

| 7,334,659 | B2 * | 2/2008 | Racz | B60K 5/12 |
| | | | | 180/352 |
| 8,251,048 | B2 * | 8/2012 | Kusa | B62J 35/00 |
| | | | | 123/518 |
| 9,452,670 | B2 * | 9/2016 | Oshima | B60K 5/1216 |
| 9,873,316 | B2 * | 1/2018 | Lovold | B60K 13/04 |
| 2015/0090514 | A1 * | 4/2015 | Oshima | B60K 5/12 |
| | | | | 180/291 |
| 2018/0201086 | A1 * | 7/2018 | Ran | B60K 5/1208 |

FOREIGN PATENT DOCUMENTS

| BR | PI0805390 A2 | * | 12/2008 | | |
| CN | 2902871 Y | * | 5/2007 | | |
| CN | 104943523 A | * | 9/2015 | ............. | B60G 21/05 |
| GB | 1434453 A | * | 5/1976 | ........... | B60K 5/1216 |
| JP | 2002302087 A | * | 10/2002 | ............... | B60K 5/12 |

OTHER PUBLICATIONS

CN-2902871-Y English Translation (Year: 2007).*
BR-PI0805390-A2 English Translation (Year: 2008).*

* cited by examiner

Primary Examiner — James A Shriver, II
Assistant Examiner — Michael T. Walsh
(74) Attorney, Agent, or Firm — Barry Choobin; Patent 360

(57) ABSTRACT

An apparatus and methods are provided for suspending a rear-mounted drivetrain assembly in a chassis of an off-road vehicle. The apparatus includes one or more front mounts for coupling a frontmost portion of the drivetrain assembly to the chassis. The front mounts suspend the frontmost portion from a seat crossmember comprising the chassis. A rearmost portion of the drivetrain assembly is suspended from a rear portion of the chassis by way of a hanger. The hanger is coupled with the rear portion of the chassis by way of one or more mounts disposed on a pair of lower rear stays comprising the chassis. Experimentation has demonstrated that suspending the drivetrain assembly within the rear portion of the chassis prevents impacts on the bottom of the chassis from affecting drivetrain alignment.

7 Claims, 4 Drawing Sheets

SUSPENDED REAR-MOUNT DRIVETRAIN ASSEMBLY

PRIORITY

This application claims the benefit of and priority to U.S. Provisional application, entitled "Suspended Rear-Mount Drivetrain Assembly," filed on May 3, 2021, and having application Ser. No. 63/183,184, the entirety of said application being incorporated herein by reference.

FIELD

Embodiments of the present disclosure generally relate to the field of vehicle chassis systems. More specifically, embodiments of the disclosure relate to an apparatus and methods for a suspended rear-mount drivetrain assembly for an off-road vehicle.

BACKGROUND

Off-road vehicles enjoy an enthusiastic following because of their many uses and versatility. As a result, several types of motorsports involve racing of various types of off-road vehicles. For example, competitions exist that are dedicated to various types of terrain, such as rally, desert racing, and rock-crawling. Besides their use in various motorsports, off-road vehicles commonly are used for sight-seeing and traveling to areas that may not be accessed by way of standard, paved roads.

The use of higher clearance, higher traction vehicles enables off-road vehicles to access trails and roads having rough, low traction surfaces that may not be traversed using a standard, on-road vehicle. As such, off-road vehicles typically comprise larger wheels, wider tires, and suspension configurations that are specifically engineered for use in off-road applications. As a consequence of such suspension configurations, as well as the rough terrain typically traversed, driver and passenger safety is a crucial concern. For example, drivers and passengers typically must be wear safety restraints during off-road travel. A wide variety of different types of safety harnesses are available for use with off-road vehicles.

Unlike on-road vehicles, such as passenger cars, off-road vehicles typically are open, often lacking windows, doors, and body panels common to passenger cars. A chassis comprising a structural arrangement of welded tubes typically is configured to support components of the off-road vehicle. For example, a front portion of the chassis is configured to support a front suspension of the off-road vehicle and various components of the off-road vehicle, such as a steering gear, a front differential, and the like. A rear portion of the chassis is configured to support a rear suspension of the off-road vehicle, such as rear trailing arms, as well as support various drivetrain components, such as a transaxle, a rear differential, an engine, and the like. Further, a roll cage or canopy comprising a welded tube structure coupled to the chassis is configured to protect the driver and passengers in the event of a rollover situation.

Given that off-road vehicles routinely travel over very rough terrain, such as mountainous regions, and are prone to tipping over, there is a desire to improve the mechanical strength, safety, convenience, and comfort of off-road vehicles, while at the same improving the performance of such vehicles.

SUMMARY

An apparatus and methods are provided for suspending a rear-mounted drivetrain assembly in a chassis of an off-road vehicle. The apparatus includes one or more front mounts for coupling a frontmost portion of the drivetrain assembly to the chassis. The front mounts suspend the frontmost portion from a seat crossmember comprising the chassis. A rearmost portion of the drivetrain assembly is suspended from a rear portion of the chassis by way of a hanger. The hanger is coupled with the rear portion of the chassis by way of one or more mounts disposed on a pair of lower rear stays comprising the chassis. Experimentation has demonstrated that suspending the drivetrain assembly within the rear portion of the chassis prevents impacts on the bottom of the chassis from affecting drivetrain alignment.

In an exemplary embodiment, an apparatus for mounting a drivetrain assembly in an off-road vehicle comprises: one or more front mounts for coupling a frontmost portion of the drivetrain assembly to a chassis of the vehicle; a hanger for fastening to a rearmost portion of the drivetrain assembly; and one or more rear mounts for suspending the hanger from a rear portion of the chassis.

In another exemplary embodiment, the rear portion of the chassis is configured to suspend the drivetrain assembly above lower skid bars and skid plates disposed at a bottom of the rear portion. In another exemplary embodiment, the one or more front mounts are configured to couple the frontmost portion of the drivetrain assembly to a seat crossmember comprising the chassis. In another exemplary embodiment, the one or more front mounts comprise two front mounts for coupling the frontmost portion to the seat crossmember. In another exemplary embodiment, any one or more of the two front mounts comprises a bushing variety of mount.

In another exemplary embodiment, the one or more rear mounts are configured to couple the hanger to lower rear stays comprising the chassis. In another exemplary embodiment, the one or more rear mounts comprise two rear mounts for suspending the hanger from the lower rear stays. In another exemplary embodiment, any one or more of the two rear mounts comprises a bushing variety of mount. In another exemplary embodiment, the hanger is configured to fastened to a transaxle or a rear differential comprising the rearmost portion of the drivetrain assembly.

In an exemplary embodiment, a method for mounting a drivetrain assembly in an off-road vehicle comprises: coupling a frontmost portion of the drivetrain assembly to a chassis of the vehicle; suspending a hanger from a rear portion of the chassis; and fastening the hanger to a rearmost portion of the drivetrain assembly.

In another exemplary embodiment, coupling includes coupling the frontmost portion to a seat crossmember comprising the chassis. In another exemplary embodiment, coupling includes causing the frontmost portion to be suspended from the seat crossmember. In another exemplary embodiment, fastening includes fastening the hanger to a transaxle or a rear differential comprising the rearmost portion of the drivetrain assembly. In another exemplary embodiment, suspending includes coupling the hanger to lower rear stays comprising the chassis. In another exemplary embodiment, suspending includes causing the rearmost portion to be suspended from the lower rear stays.

In an exemplary embodiment, a rear portion of a chassis for an off-road vehicle comprises: a seat crossmember for suspending a frontmost portion of a drivetrain assembly; and a pair of lower rear stays for suspending a rearmost portion of the drivetrain assembly.

In another exemplary embodiment, the seat crossmember includes one or more front mounts for coupling with the frontmost portion. In another exemplary embodiment, the seat crossmember is disposed between rear pillars comprising the chassis. In another exemplary embodiment, the pair of lower rear stays includes one or more rear mounts for coupling with a hanger that is fastened to the rearmost portion.

These and other features of the concepts provided herein may be better understood with reference to the drawings, description, and appended claims.

BRIEF DESCRIPTION OF THE DRAWINGS

The drawings refer to embodiments of the present disclosure in which.

Figure 1:
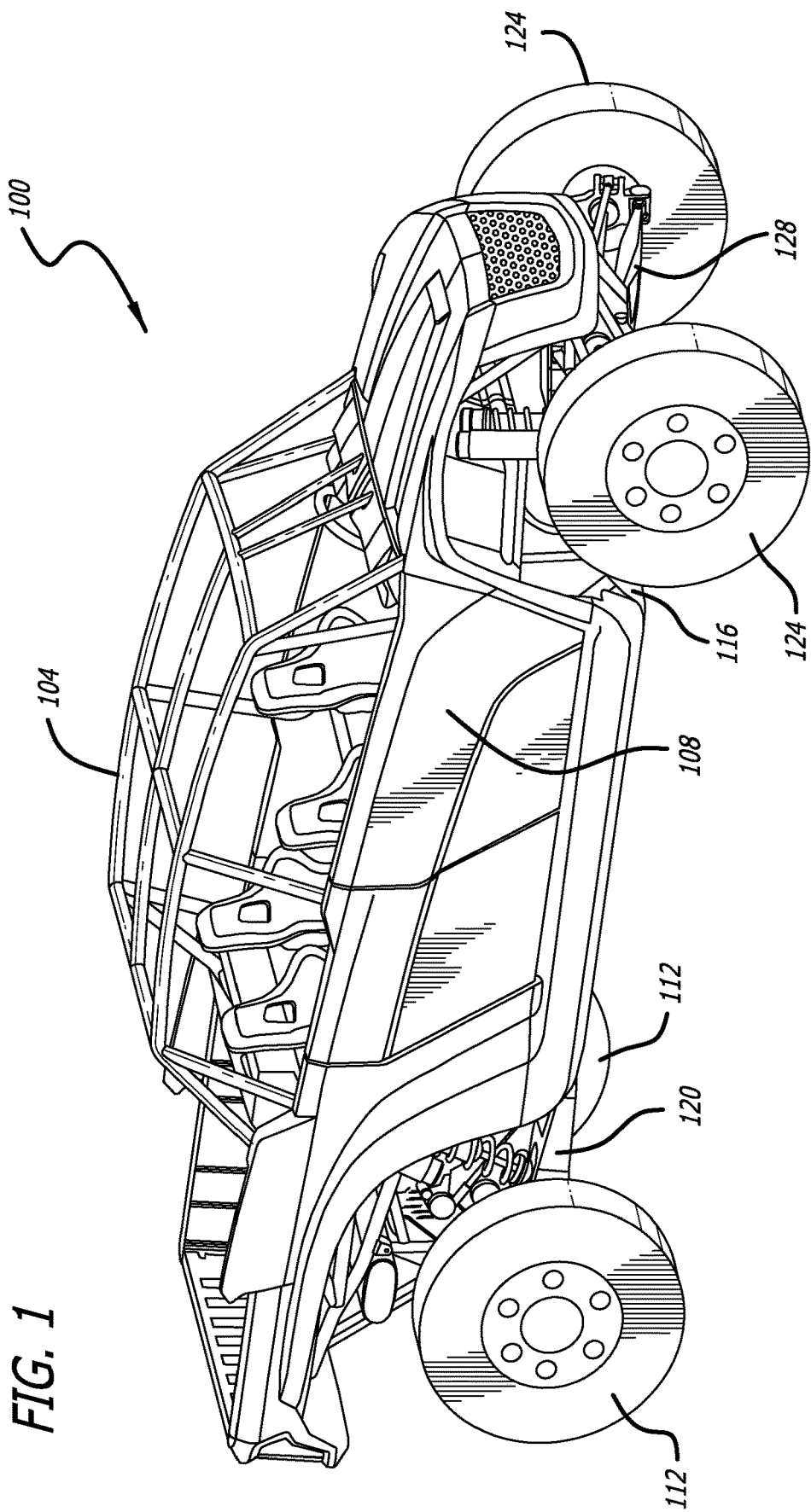
FIG. 1 illustrates an exemplary embodiment of an off-road vehicle that is configured to seat up to four occupants and is suitable for implementation of a suspended rear-mount drivetrain assembly in accordance with the present disclosure.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the suspended rear-mount drivetrain assembly and methods disclosed herein may be practiced without these specific details. In other instances, specific numeric references such as "first mount," may be made. However, the specific numeric reference should not be interpreted as a literal sequential order but rather interpreted that the "first mount" is different than a "second mount." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Off-road vehicles typically comprise larger wheels, wider tires, and suspension configurations that are specifically engineered for use in off-road applications. As a consequence of such suspension configurations, as well as the rough terrain typically traversed, driver and passenger safety is a crucial concern. Given that off-road vehicles routinely travel over very rough terrain, such as mountainous regions, and are prone to tipping over, there is a desire to improve the mechanical strength, safety, convenience, and comfort of off-road vehicles, while at the same improving the performance of such vehicles. Embodiments disclosed herein provide an apparatus and methods for a suspended rear-mount drivetrain assembly for an off-road vehicle.

FIG. 1 shows an off-road vehicle 100 that is particularly suitable for implementation of a suspended rear-mount drivetrain assembly in accordance with the present disclosure. As disclosed hereinabove, the off-road vehicle 100 generally is of a Utility Task Vehicle (UTV) variety that seats up to four occupants, includes a roll-over protection system 104, and may have a cab enclosure 108. Rear wheels 112 of the off-road vehicle 100 may be operably coupled with a chassis 116 by way of a trailing arm suspension system 120. Front wheels 124 may be operably coupled with the chassis 116 by way of a front suspension system 128. It should be understood, however, that the suspended rear-mount drivetrain assembly disclosed herein is not to be limited to the specific off-road vehicle 100 shown in FIG. 1, but rather the suspended rear-mount drivetrain assembly may be incorporated into a wide variety of vehicles, other than the off-road vehicle 100 of FIG. 1, without limitation.

Figure 2:
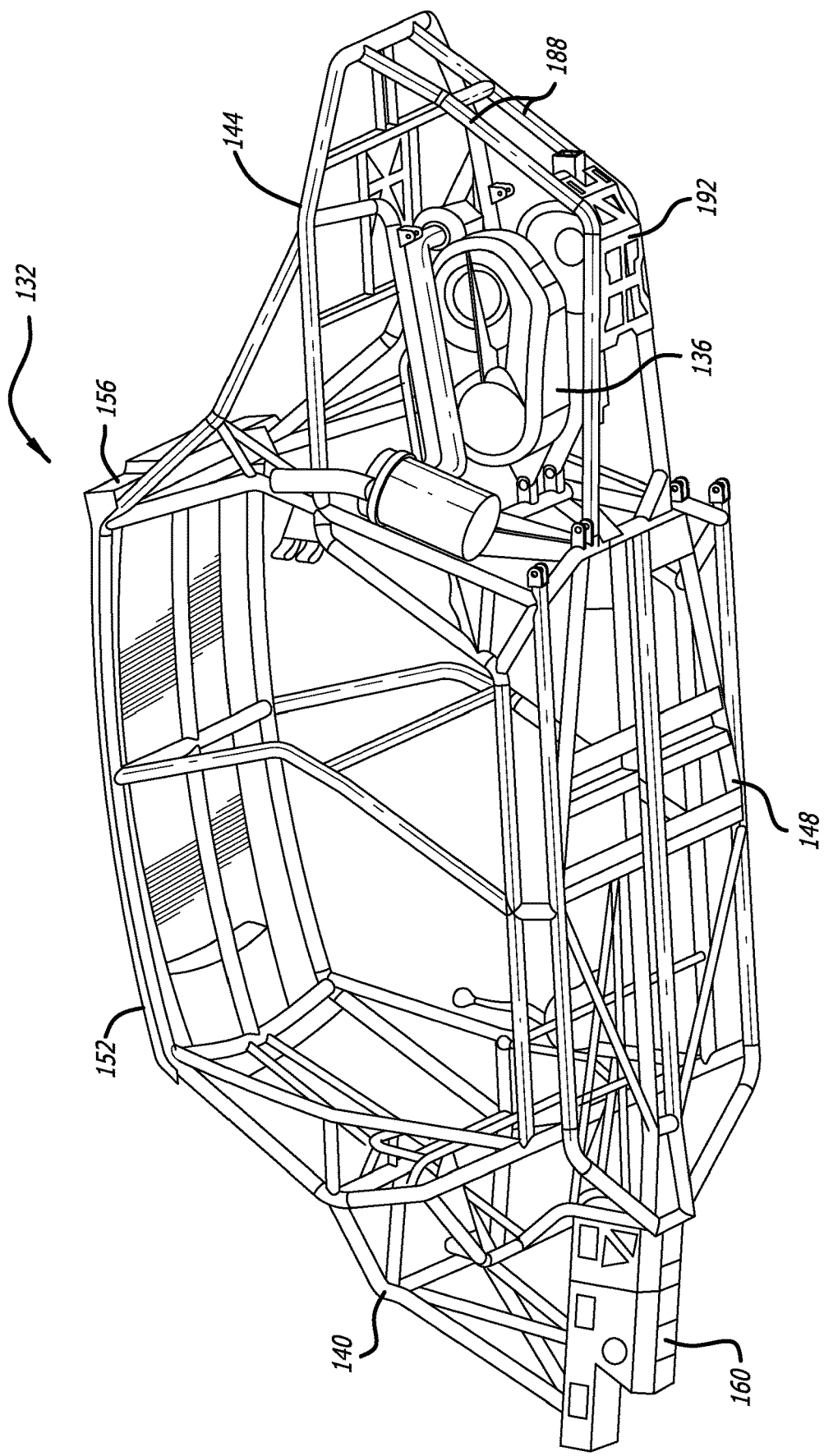
FIG. 2 illustrates a lower perspective view of an exemplary embodiment of vehicle chassis that includes a suspended rear-mount drivetrain assembly according to the present disclosure.

FIG. 2 illustrates a lower perspective view of an exemplary embodiment of vehicle chassis 132 that includes a suspended rear-mount drivetrain assembly 136 according to the present disclosure. The chassis 132 generally is a welded-tube variety of chassis that includes a front portion 140 and a rear portion 144 that are joined to an intervening passenger cabin portion 148. The passenger cabin portion 136 shown in FIG. 2 is configured to seat up to four occupants. A front canopy 152 and a rear canopy 156 impart structural integrity to the chassis 132 and provide overhead protection to occupants of the off-road vehicle 100.

The front portion 140 generally is configured to support various components comprising the off-road vehicle 100, such as, by way of non-limiting example, the front suspension 128 and a front structural bulkhead 160. The front structural bulkhead 160 may support any one or more of a transaxle, a front differential, a steering gear, a braking system, and the like, that are operably coupled with the front wheels 124 by way of the front suspension system 128, as shown in FIG. 1. Details pertaining to the front structural bulkhead 160 and the components comprising the vehicle chassis 132 may be found in U.S. Provisional application, entitled "Front Structural Bulkhead For Vehicle Chassis," filed on Mar. 22, 2021 and having application Ser. No. 63/164,079, the entirety of said application being incorporated herein by reference.

The rear portion 144 is configured to support the rear suspension 120 of the off-road vehicle 100, such as rear trailing arms, as well as support the rear-mount suspended drivetrain assembly 136, including at least an engine, a transaxle, a rear differential, an engine, and the like, as described herein. A rear hoop 164 is joined at opposite ends to rear pillars 168 and defines an upper extent of the rear portion 144. Below the rear hoop 164 are lower rear stays 172 that are coupled with the rear pillars 168 by way of a seat crossmember 180. Braces 184 couple the lower rear stays 172 to the rear hoop 164. The rear hoop 164, the lower rear stays 172 and the braces 184 comprise a structure suitable for mounting drivetrain components, such as the suspended rear-mount drivetrain assembly 136 described herein. A pair of lower skid bars 188 is disposed at a bottom of the rear portion 144 and coupled between the passenger cabin portion 148 and a rearmost portion of the rear hoop 164. Further, one or more skid plates 192 may be disposed between the lower skid bars 188, as desired. The lower skid bars 188 and the skid plates 192 serve to provide protection to an underside of the suspended rear-mount drivetrain assembly 136 during operation of the vehicle 100. As such, the rear hoop 164, the lower rear stays 172 and the lower skid bars 188 generally define an engine bay of the vehicle 100.

Figure 3:
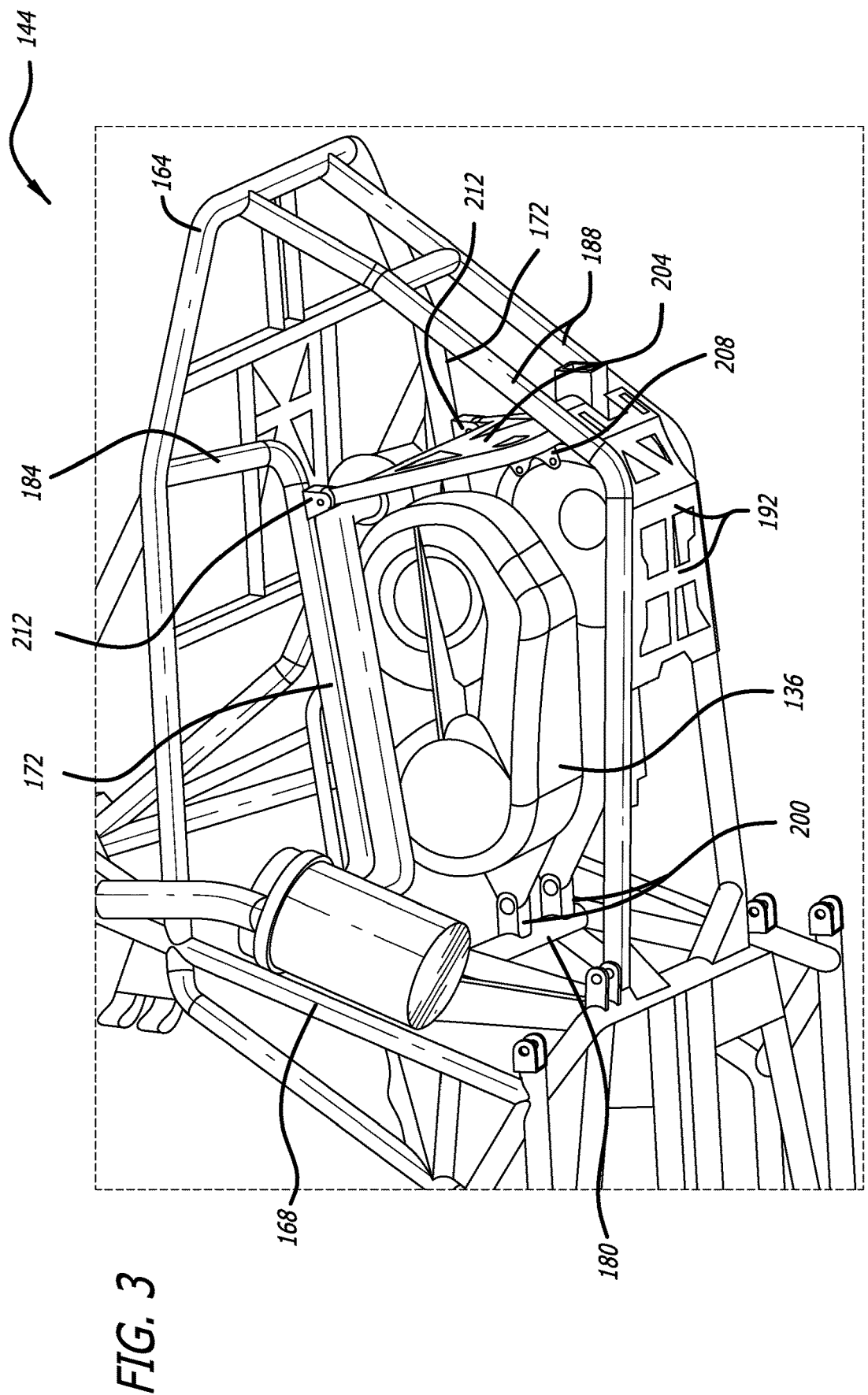
FIG. 3 illustrates a close-up view of an exemplary embodiment of a rear portion of a vehicle chassis that is configured to support a suspended rear-mount drivetrain assembly in accordance with the present disclosure.

As shown in FIG. 3, the rear portion 144 is configured to suspend the entire drivetrain assembly 136 above the lower skid bars 188 and the skid plates 192. Direct observation has demonstrated that suspending the drivetrain assembly 136, instead of mounting the drivetrain assembly 136 onto the lower skid bars 188 and skid plates 192, is advantageous for use in harsh off-road environments because critical drivetrain alignment is not affected by impact loads on the bottom of the vehicle chassis 132. To this end, a frontmost portion of the drivetrain assembly 136 is coupled with, and suspended from, the seat crossmember 180 by way of one or more front drivetrain mounts 200. In the illustrated embodiment of FIG. 3, the front drivetrain mounts 200 comprise two mounts that generally are of a bushing variety of mount. In other embodiments, however, more or less than two front drivetrain mounts 200 may be used to couple the drivetrain assembly 136 to the chassis 132, without limitation. Further, the front drivetrain mounts 200 may comprise any of various suitable devices that are found to be advantageous for coupling the drivetrain assembly 136 to the chassis 132.

Figure 4:
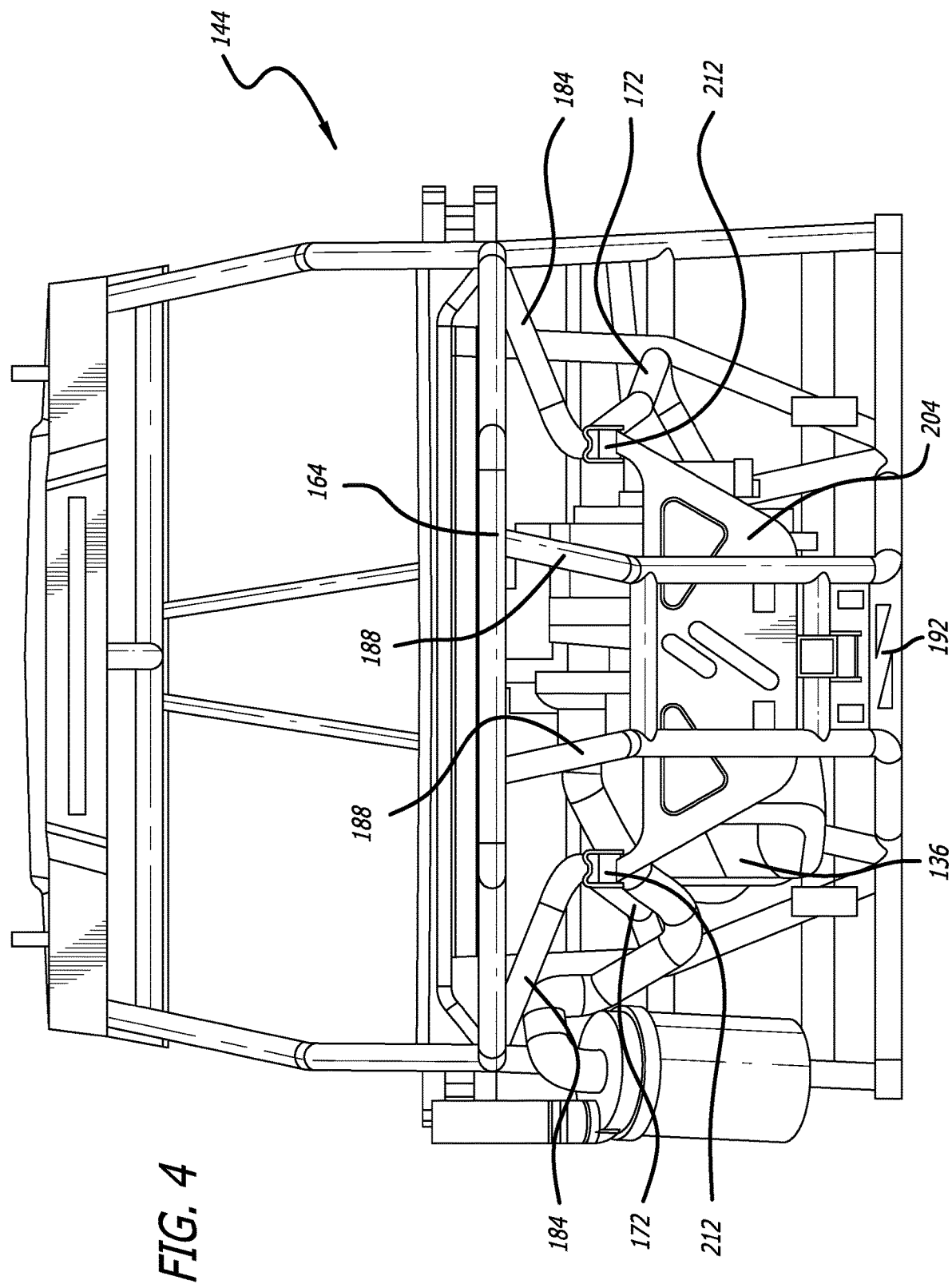
FIG. 4 illustrates rear view of an exemplary embodiment of a vehicle chassis that is configured to support a suspended rear-mount drivetrain assembly, according to the present disclosure.

As shown in FIGS. 3-4, a rearmost portion of the drivetrain assembly 136 is suspended from the lower rear stays 172 by way of a rear drivetrain hanger 204. A bottom portion 208 of the rear drivetrain hanger 204 may be fastened to a suitable rear portion of the drivetrain assembly 136, such as a rearmost portion of a transaxle or the rear differential comprising the drivetrain assembly 136. The hanger 204 may be coupled with each lower rear stay 172 by way of a rear mount 212. As shown in FIG. 4, the rear mounts 212 generally are of a bushing variety of mount. In other embodiments, however, the rear mounts 212 may comprise any of various suitable devices that are advantageous for suspending the drivetrain assembly 136 from the lower rear stays 172, without limitation.

While the suspended rear-mount drivetrain assembly and methods have been described in terms of particular variations and illustrative figures, those of ordinary skill in the art will recognize that the suspended rear-mount drivetrain assembly is not limited to the variations or figures described. In addition, where methods and steps described above indicate certain events occurring in certain order, those of ordinary skill in the art will recognize that the ordering of certain steps may be modified and that such modifications are in accordance with the variations of the suspended rear-mount drivetrain assembly. Additionally, certain of the steps may be performed concurrently in a parallel process, when possible, as well as performed sequentially as described above. To the extent there are variations of the suspended rear-mount drivetrain assembly, which are within the spirit of the disclosure or equivalent to the suspended rear-mount drivetrain assembly found in the claims, it is the intent that this patent will cover those variations as well. Therefore, the present disclosure is to be understood as not limited by the specific embodiments described herein, but only by scope of the appended claims.

What is claimed is:

1. An apparatus for mounting a drivetrain assembly in an off-road vehicle, the drivetrain assembly has a frontmost portion and a rearmost portion, the apparatus comprising:
   a rear hoop of a substantially U shape that extends rearwards, and two ends of the rear hoop are coupled to rear pillars respectively;
   a seat crossmember extending between the rear pillars;
   lower rear stays positioned below the rear hoop and coupled to the rear pillars by way of the seat crossmember;
   braces coupling the rear hoop to the lower rear stays;
   one or more front mounts coupled to the seat crossmember and are configured for coupling the frontmost portion of the drivetrain assembly; and
   a hanger mounted to the lower rear stays and extends downwards, wherein the hanger is configured for fastening to the rearmost portion of the drivetrain assembly, wherein the hanger is configured to fasten to a transaxle or a rear differential of the rearmost portion of the drivetrain assembly,
   wherein the apparatus is configured to suspend the drivetrain assembly through only the one or more front mounts and the hanger.

2. The apparatus of claim 1, wherein the apparatus further comprises:
   a pair of skid bars extending downwards from a rearmost portion of the rear hoop; and
   skid plates extending between the pair of skid bars, wherein the drivetrain assembly is suspended above the skid plates, wherein the pair of skid bars and the skid plates are configured not to contact the drivetrain assembly.

3. The apparatus of claim 1, wherein the one or more front mounts comprise two front mounts.

4. The apparatus of claim 3, wherein the two front mounts are bushing mounts.

5. The apparatus of claim 1, wherein the apparatus further comprises one or more rear mounts configured to couple the hanger to lower rear stays.

6. The apparatus of claim 5, wherein the one or more rear mounts comprise two rear mounts stays.

7. The apparatus of claim 6, wherein the two rear mounts are bushing mounts.

* * * * *